(12) United States Patent
Lee

(10) Patent No.: US 10,164,770 B1
(45) Date of Patent: Dec. 25, 2018

(54) PIPELINED DATA CRYPTOGRAPHY DEVICE AND METHOD

(71) Applicant: MARVELL INTERNATIONAL LTD., Hamilton (BM)

(72) Inventor: Sean Lee, Fremont, CA (US)

(73) Assignee: Marvell International Ltd. (BM)

( * ) Notice: Subject to any disclaimer, the term of this patent is extended or adjusted under 35 U.S.C. 154(b) by 256 days.

(21) Appl. No.: 15/168,640

(22) Filed: May 31, 2016

Related U.S. Application Data

(60) Provisional application No. 62/170,460, filed on Jun. 3, 2015.

(51) Int. Cl.
| | | |
|---|---|---|
| G06F 21/80 | (2013.01) | |
| H04L 9/06 | (2006.01) | |
| G06F 12/14 | (2006.01) | |
| G06F 9/38 | (2018.01) | |
| G06F 8/41 | (2018.01) | |

(52) U.S. Cl.
CPC .......... *H04L 9/0631* (2013.01); *G06F 8/445* (2013.01); *G06F 9/38* (2013.01); *G06F 9/382* (2013.01); *G06F 9/3867* (2013.01); *G06F 12/1408* (2013.01); *G06F 12/1441* (2013.01); *G06F 21/80* (2013.01); *G06F 2212/1052* (2013.01); *G06F 2212/402* (2013.01); *H04L 2209/125* (2013.01)

(58) Field of Classification Search
CPC . G06F 8/445; G06F 9/38; G06F 9/382; G06F 21/80
See application file for complete search history.

(56) References Cited

U.S. PATENT DOCUMENTS

| | | | | |
|---|---|---|---|---|
| 8,036,377 B1* | 10/2011 | Poo | ....................... | H04L 9/0631 380/28 |
| 9,165,164 B2* | 10/2015 | Manabe | ................... | G09C 1/00 |
| 2006/0126390 A1* | 6/2006 | Gorobets | ............ | G11C 11/5628 365/185.22 |
| 2009/0060197 A1* | 3/2009 | Taylor | ................... | H04L 9/0618 380/277 |
| 2016/0182223 A1* | 6/2016 | Kishinevsky | ......... | H04L 9/0631 380/28 |

OTHER PUBLICATIONS

Ahmed et al., "Effective Implementation of AES-XTS on FPGA", pp. 184-186 (Year: 2011).*

* cited by examiner

*Primary Examiner* — Thaddeus J Plecha

(57) ABSTRACT

Apparatus, methods, and other embodiments associated with mitigating time delays through a data cryptography device are disclosed. In one embodiment, a method includes receiving input data to be processed on a sector-by-sector basis through a data cryptography device. The input data is organized as multiple commands of the input data, with each command including multiple sectors of the input data, and with each sector including multiple blocks of the input data. The input data is processed through the device to generate encrypted or decrypted sectors of data while mitigating time delays through the device. Time delay mitigation is accomplished by pipeline processing the blocks for each sector through the device, pipeline processing the sectors for each command through the device, and pipeline processing the commands through the device. The encrypted or decrypted sectors of data generated by the device are then output by the device.

20 Claims, 9 Drawing Sheets

PIPELINED DATA CRYPTOGRAPHY DEVICE AND METHOD

CROSS REFERENCE TO RELATED APPLICATIONS

This patent disclosure claims the benefit of U.S. Provisional Application Ser. No. 62/170,460 filed on Jun. 3, 2015, which is hereby wholly incorporated by reference.

BACKGROUND

Data cryptography devices are used for encrypting and/or decrypting data, for example, for security purposes. Time delays or latencies can occur when processing data through a data cryptography device. When processing large amounts of data, these time delays can add up and become substantial, possibly making a particular type of time-sensitive application unusable. Such time delays can include preparation time delays and processing time delays. For devices that perform encryption and/or decryption based on the XTS-AES standard, the preparation time delays may include range search latencies, tweak zero (0) computation latencies, and last round key computation latencies. The processing time delays may include data fetching latencies and data processing latencies.

SUMMARY

In general, in one aspect, this specification discloses a data cryptography device which includes path control logic and processing logic for mitigating time delays. The processing logic includes a multi-core processor and is configured for receiving input data to be encrypted or decrypted as part of a cryptography process on a sector-by-sector basis. The input data is organized into multiple commands, with each command including multiple sectors of the input data, and with each sector including multiple blocks of the input data. The path control logic is configured for controlling an internal path and data flow through the data cryptography device, as part of the cryptography process, in response to receiving path control information for each command of the multiple commands. The processing logic is further configured for pipeline processing the multiple blocks for each sector of the multiple sectors. The multi-core processor is used to accomplish the pipeline processing of the blocks based at least in part on a tweak zero value and a last round key value computed for each sector of the multiple sectors. The processing logic is also configured for pipeline processing the multiple sectors, for each command of the multiple commands, and the multiple commands themselves based at least in part on the path control information.

In general, in another aspect, this specification discloses a method that is performable, for example, by a data cryptography device to encrypt and decrypt data while mitigating time delays. The method includes receiving input data to be processed on a sector-by sector basis through the data cryptography device. The input data is organized as multiple commands of the input data, with each command including multiple sectors of the input data, and with each sector including multiple blocks of the input data. The input data is processed through the data cryptography device to generate encrypted sectors of data or decrypted sectors of data while mitigating time delays through the data cryptography device. The processing to mitigate the time delays includes pipeline processing of the input data. The multiple blocks of the input data are pipeline processed, for each sector of the multiple sectors, through the data cryptography device. The multiple sectors of the input data are pipeline processed, for each command of the multiple commands, through the cryptography device. Also, the multiple commands of the input data are pipeline processed through the data cryptography device. The encrypted or decrypted sectors of data, generated by the data cryptography device during processing, are output by the data cryptography device.

In general, in another aspect, this specification discloses an integrated circuit chip for encrypting and decrypting data while mitigating time delays. In one embodiment, the integrated circuit chip includes processing logic having a multi-core processor. The processing logic is configured as an integrated circuit on the chip for receiving input data to be encrypted or decrypted as part of a cryptography process on a sector-by-sector basis. The input data is organized into multiple commands, with each command including multiple sectors of the input data, and with each sector including multiple blocks of the input data. The integrated circuit chip also includes tweak builder logic configured as an integrated circuit on the chip for performing range searching, tweak zero computations, and last round key computations as part of the cryptography process. The tweak builder logic performs the range searching, the tweak zero computations, and the last round key computations in response to receiving a tweak build request for a sector of the multiple sectors of the input data. The integrated circuit chip further includes tweak buffer logic configured as an integrated circuit on the chip for buffering at least a tweak zero value and a last round key value computed by the tweak builder logic for each sector of the input data as part of the cryptography process. The integrated circuit chip also includes path control logic configured as an integrated circuit on the chip for controlling an internal data path and data flow through the data cryptography device, as part of the cryptography process, in response to receiving path control information for each command. The processing logic is further configured for pipeline processing the multiple blocks for each sector, via the multi-core processor, based at least in part on the tweak zero value and the last round key value for each sector. The processing logic is further configured for pipeline processing the multiple sectors and the multiple commands based at least in part on the path control information.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
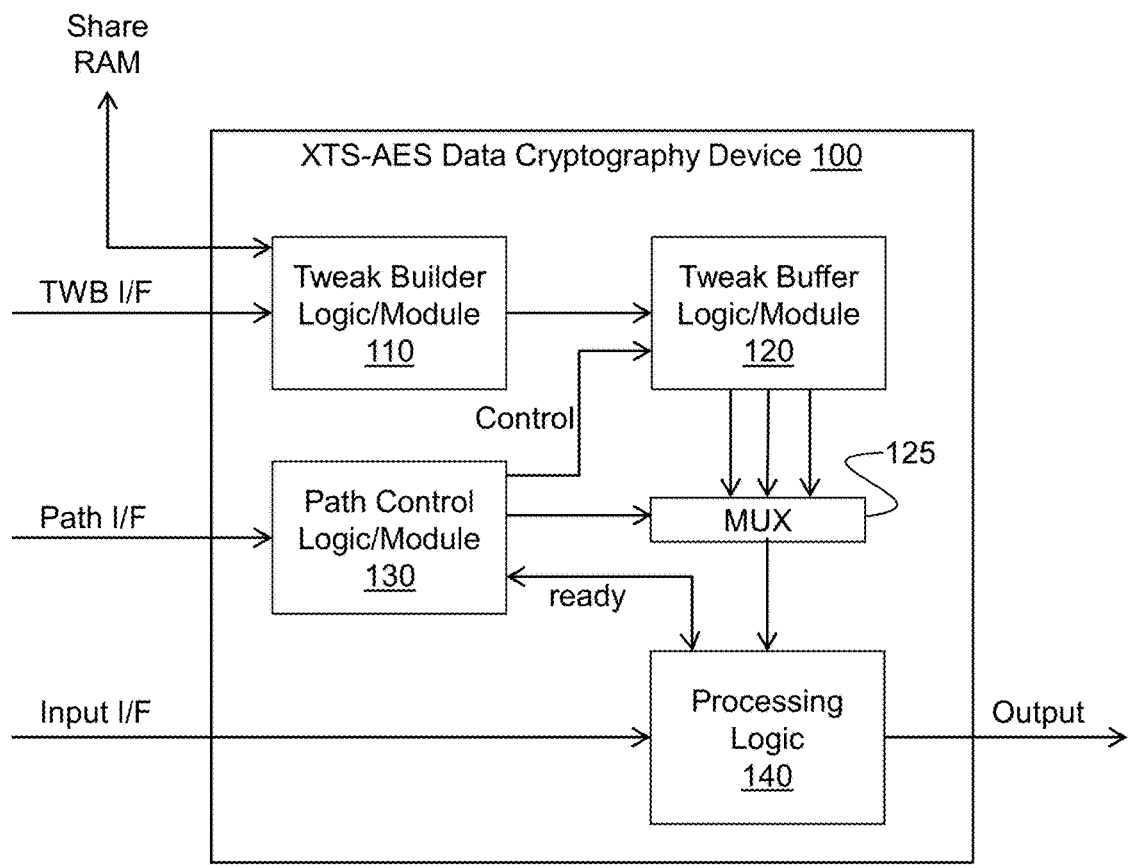
FIG. 1 illustrates one embodiment of a data cryptography device configured to encrypt and decrypt data while mitigating preparation and processing time delays through the data cryptography device.

Described herein are examples of systems, apparatus, methods, and other embodiments associated with data cryptography (data encryption and data decryption). In particular, embodiments are described herein that mitigate time delays, such as preparation latencies and processing latencies, through a data cryptography device via pipeline processing techniques. Input data (to be encrypted or decrypted) is organized as commands each having multiple sectors, and the multiple sectors each having multiple blocks. Pipeline processing through the data cryptography device is accomplished at the block level, the sector level, and the command level.

In one embodiment, pipeline processing at the multiple data levels (block, sector, command) is accomplished via processing logic, having a multi-core processor and input exclusive-or logic and output exclusive-or logic which operate independently of each other, as well as via dynamic path control through the data cryptography device. The cores of the multi-core processor are employed in a circular manner such that a next available core is used across boundaries of blocks, sectors, and commands, without having to revert back to a first core (e.g., core 0) when starting to process a next sector or a next command, for example. In this manner, cryptographic preparation and processing latencies can be mitigated to allow faster data access from and data storage to, for example, a storage disk.

The term "cryptography", as used herein, refers to processes and devices associated with the encryption and/or decryption of data.

The term "input data", as used herein, refers to data that is input into a data cryptography device to be encrypted or decrypted on a sector-by-sector basis. The input data is organized into commands, sectors, and blocks. A command may include multiple sectors of the input data and a sector may include multiple blocks of the input data, in accordance with one embodiment.

The term "mitigate", as used herein, refers to reducing or eliminating time delays (latencies) associated with encrypting and decrypting input data through a data cryptography device.

The term "pipeline processing", as used herein, refers to techniques of mitigating preparation latencies and processing latencies associated with encrypting and decrypting input data. The techniques provide parallel or simultaneous processing of data, via computer instructions, within a computer.

The term "multi-core processor", as used herein, refers to a single computing component with two or more independent processing units (cores) that read and execute computer instructions.

The term "XTS-AES", as used herein, refers to a tweakable block cipher that acts on data units of 128 bits or more and uses the Advanced Encryption Standard (AES) block cipher as a subroutine. IEEE 1619 is the Institute of Electrical and Electronics Engineers (IEEE) standard architecture for encrypted shared storage media and uses the XTS-Advanced Encryption Standard (XEX-based Tweaked CodeBook mode (TCB) with ciphertext stealing (CTS)), where "XEX" refers to the operations of exclusive-or/encryption/exclusive-or.

An "integrated circuit" is an electronic circuit formed on a small piece of semiconducting material (a chip) to perform functions, instead of performing the same functions as a larger circuit made from discrete components, for example. A "chip" is the small piece of semiconducting material (often silicon) on which an integrated circuit is embedded. The terms "chip" and "integrated circuit" may be used interchangeably herein, however. The term "integrated circuit chip" may be used herein to mean a chip having an integrated circuit formed thereon. The term "integrated circuit device", as used herein, refers to a device having multiple integrated circuits on multiple chips.

FIG. 1 illustrates one embodiment of a data cryptography device 100 configured to mitigate latencies (time delays) when encrypting and decrypting input data. The data cryptography device 100 includes, but is not limited to, tweak builder logic 110, tweak buffer logic 120, multiplexer (MUX) 125, path control logic 130, processing logic 140, or any combination thereof. In one embodiment, the data cryptography device 100 is implemented on a chip (i.e., a system-on-chip or SOC configuration) including one or more integrated circuits configured to perform one or more of the functions described herein. In another embodiment, the logics of the data cryptography device 100 may be part of an executable algorithm configured to perform the functions of the logics where the algorithm is stored in a non-transitory medium. In accordance with one embodiment, the data cryptography device 100 may be a part of a storage controller used for secure enterprise data storage. In accordance with another embodiment, the data cryptography device 100 may be separate from the storage controller and may be configured to operably connect to the storage controller via an operable connection (e.g., via a network connection).

Other embodiments may provide different logics or combinations of logics that provide the same or similar functionality as the data cryptography device 100 of FIG. 1. In one embodiment, the data cryptography device 100 is an executable application including algorithms and/or program modules configured to perform the functions of the logics. The application is stored in a non-transitory computer storage medium. That is, in one embodiment, the logics of the data cryptography device 100 are implemented as modules of computer-executable instructions stored on a computer-readable medium.

The data cryptography device 100 of FIG. 1 is configured to receive input data, via the input interface (I/F), and encrypt or decrypt the input data to form sectors of encrypted or decrypted output data based on the XTS-AES standard, in accordance with one embodiment. The input data is processed (encrypted or decrypted) in such a way that preparation and processing latencies (time delays) are mitigated. Such latency mitigation is accomplished by employing multi-level pipeline processing techniques. The input data (to be encrypted or decrypted) is organized as commands each having multiple sectors, and the multiple sectors each having multiple blocks (e.g., AES blocks). The sectors of the input data may correspond to the sectors of a storage disk, in accordance with one embodiment. Pipeline processing through the data cryptography device is accomplished at the block level, the sector level, and the command level to mitigate latencies.

Preparation latencies (time delays) can occur for every sector of the input data and may include a range search latency, a tweak zero (0) computation latency, and a last round key computation latency. A range search latency is caused by searching for and reading range information from an external memory (e.g., Share RAM) based on a logical block address (LBA) of a sector. The range information can include encryption/decryption keys (Key 1, Key 2), an initialization vector (IV), and operational configuration data related to AES operation. A tweak zero (0) computation latency is caused by computing a tweak zero (0) value related to AES operation. A last round key computation latency is caused by computing a last round key value related to AES operation which is used in decryption. Range searching, tweak zero (0) computations, and last round key computations are discussed further later herein.

Processing latencies (time delays) can occur for every block of the input data and may include data fetching latencies and data processing latencies. A data fetching latency is the time that the data cryptography device spends to collect a block of the input data from a data bus before encryption or decryption of that block. The data fetching latency depends on the data bus width. For example, in one embodiment, a 64-bit data bus may require two clock cycles to receive a 128-bit AES block. The data processing latency is the time that processing logic 140 uses to process each block of the input data. For example, in one embodiment, a 16-byte AES block may require fourteen (14) clock cycles to process the block. Data fetching latencies and data processing latencies are discussed further later herein.

In one embodiment, processing logic 140 is configured to receive the input data, via the input interface (I/F), to be encrypted or decrypted as part of a cryptography process on a sector-by-sector basis. Processing logic 140 includes a multi-core processor which is discussed later herein with respect to FIG. 2. In one embodiment, tweak builder logic 110 is configured to perform range searching, tweak zero computations, and last round key computations, as part of the cryptography process, in response to receiving a tweak build request for a sector of the multiple sectors of the input data. A tweak build request for a sector is received via the TWB interface (I/F) and includes a logical block address (LBA) for the sector, a sector size for the sector, and a buffer identifier (ID), in accordance with one embodiment.

In one embodiment, tweak buffer logic 120 is configured to buffer (temporarily store) tweak build information that includes at least a tweak zero (0) value and a last round key value, computed by tweak builder logic 110, for each sector of the input data as part of the cryptography process. Tweak buffer logic 120 may also buffer tweak build information that includes a sector size, a bypass indicator, Key 1, Key size (e.g., 128-bit, 192-bit, or 256-bit), and a valid bit (indicates if the buffer is valid or empty) as discussed in more detail later herein. MUX 125 is configured to transfer the tweak build information out of tweak buffer logic 120 to processing logic 140, in accordance with one embodiment.

In one embodiment, path control logic 130 is configured to control an internal data path and data flow through the data cryptography device 100, as part of the cryptography process, in response to receiving path control information for each command of the input data. The path control information is received via the path interface (I/F) and includes a path start signal, a path identifier (ID) for each command, and a number of sectors for each command as discussed in more detail later herein.

In one embodiment, processing logic 140 is configured to perform pipeline processing of blocks, sectors, and commands of the input data. Processing logic 140 is configured to perform pipeline processing on multiple blocks of each sector of the input data, via a multi-core processor, based at least in part on the tweak zero (0) value and the last round key value computed for each sector by tweak builder logic 110. Processing logic 140 is also configured to perform pipeline processing on multiple sectors for each command of the input data based at least in part on the path control information. Processing logic 140 is further configured to perform pipeline processing on multiple commands of the input data based at least in part on the path control information. Details of the various levels of pipeline processing are discussed later herein.

In this manner, both preparation latencies and processing latencies can be mitigated by the data cryptography device 100 of FIG. 1 by performing pipeline processing at block, sector, and command levels of the input data as discussed and illustrated in more detail later herein. Such mitigation of cryptographic preparation and processing latencies can allow faster data access from (and data storage to), for example, a storage disk.

Figure 2:
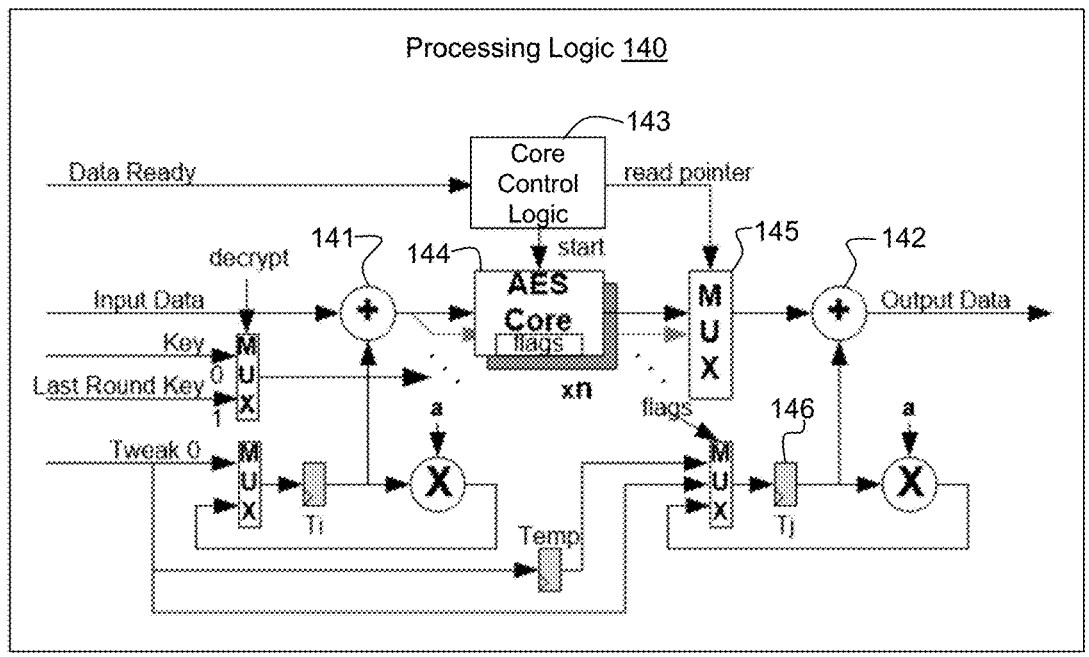
FIG. 2 illustrates one embodiment of processing logic of the data cryptography device of FIG. 1.

FIG. 2 illustrates one embodiment of processing logic 140 of the data cryptography device 100 of FIG. 1. Processing logic 140 performs data encryption and decryption, sector by sector, according to the XTS-AES standard. Processing logic 140 performs pipeline processing between each AES block, between each sector, and between each command of the input data. In one embodiment, processing logic 140 is started by a start request from path control logic 130, along with encryption/decryption information (tweak build information), such as Key 1, from tweak buffer logic 120. Upon accepting the start request, processing logic 140 returns an acknowledge signal back to path control logic 130 and starts the transfer of the input data for a new sector (or continues the transfer of the input data without stopping the data interface (input I/F).

Processing logic 140 includes input exclusive-or (XOR) logic 141 and output XOR logic 142 which are configured to operate independently of each other during tweak processing. In one embodiment, the input data stream is divided into one or more 16-byte AES blocks. During operation, each AES block is XOR'd with an associated tweak value before (via XOR logic 141) and after (via XOR logic 142) encryption or decryption. Therefore, two different tweak processes are accommodated (one on the input side and one on the output side), possibly from different sectors. After using the tweak zero (0) value (or a previous tweak value) in a tweak process, a next tweak value is computed by multiplying the current tweak value by an alpha value (a).

Processing logic 140 includes core control logic 143 which, in one embodiment, is similar to a first-in-first-out (FIFO) controller. Processing logic 140 also includes a multi-core processor 144 having multiple cores, where each core is configured to perform both encryption and decryption. A write pointer (start) from core control logic 143 controls a core start to determine which idle core of the multi-core processor 144 to use next. A read pointer from core control logic 143 controls an output data multiplexer 145 to determine which core of the multi-core processor 144 to output data from next. In this way, processing logic 140 is flexible and does not have to revert back to using a first core (e.g., core 0) when, for example, starting to process a new sector.

When data is fed to an idle core of the multi-core processor 144, flags are passed along with the data. When a core is selected to output an encryption or decryption result, the flags are used to update a tweak register 146 on the output side. For example, a flag may direct that the output tweak register 146 be updated with a new tweak value from the temporary register 147, or continue to form a next tweak value by multiplying the previous tweak value by alpha (a). Such flexibility facilitates the pipeline processing of the sectors.

Figure 3:
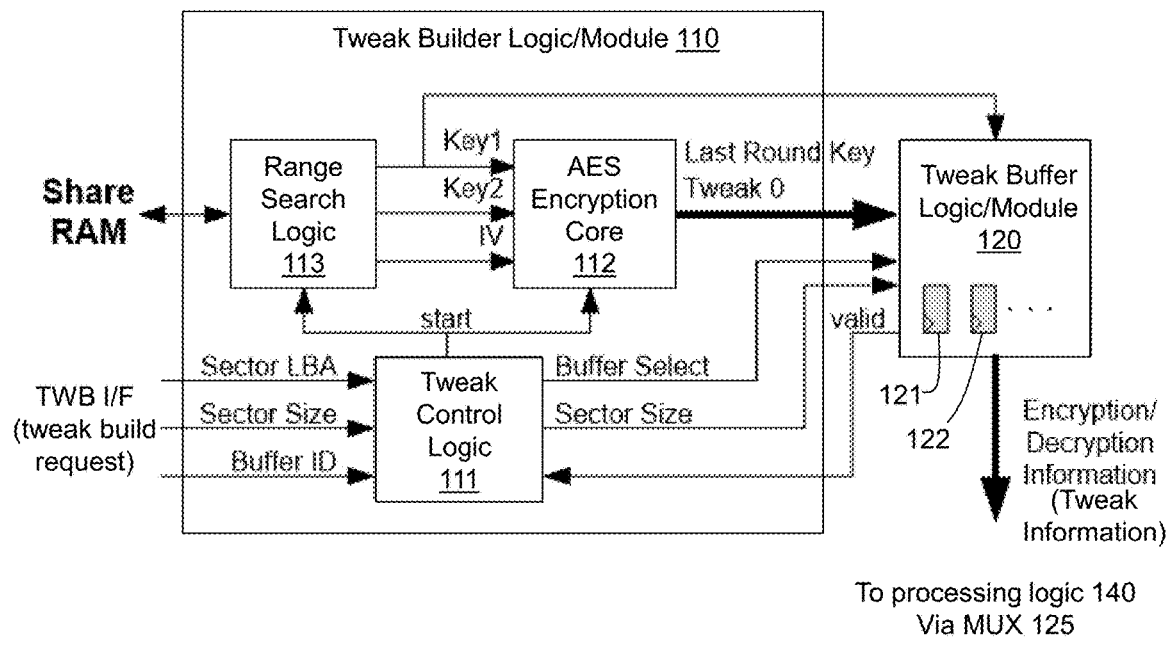
FIG. 3 illustrates one embodiment of tweak builder logic and tweak buffer logic of the data cryptography device of FIG. 1.

FIG. 3 illustrates one embodiment of tweak builder logic 110 and tweak buffer logic 120 of the data cryptography device 100 of FIG. 1. Tweak builder logic 110 is configured to perform range searches, tweak zero (0) computations, and last round key computations in response to receiving a tweak build request for a sector of the input data via the TWB interface (I/F). The tweak build request includes a sector LBA, a sector size, and a buffer ID which comes into tweak control logic 111 of tweak builder logic 110. In one embodiment, the timing of the tweak build request is managed through the TWB interface (I/F) to maintain the pipelined process. In general, the tweak build request of a next sector is sent to tweak builder logic 110 while processing logic 140 is still processing a current sector.

In one embodiment, tweak builder logic 110 includes a built-in AES encryption core 112 (encryption core processor), with additional key generation logic, for performing encryption. The AES encryption core 112 is smaller in physical area (in an integrated circuit chip configuration) than each core of the multi-core processor 144 of processing logic 140 which performs both encryption and decryption. The AES encryption core 112 is configured to compute a tweak zero (0) value and a last round key value simultaneously based on range information.

Range search logic 113 is configured to communicate with an external Share RAM to obtain the range information used in the AES operation. Again, the range information includes encryption/decryption keys (Key 1, Key 2), an initialization vector (IV), and operational configuration data related to AES operation. When a tweak build request is detected by tweak control logic 111, tweak control logic 111 starts both the AES encryption core 112 and range search logic 113. The AES encryption core 112 proceeds to compute a tweak zero (0) value and a last round key value. In general, tweak control logic 111 is configured to control range search logic 113, the encryption core processor 112, and tweak buffer logic 120 based on the tweak build request.

The tweak zero (0) value and the last round key value are stored in a buffer (e.g., buffer 121 or buffer 122 pointed to by the buffer ID) of tweak buffer logic 120, along with a sector size, a bypass indicator, Key 1, Key size, and a valid bit as tweak build information. The tweak build information (encryption/decryption information in FIG. 3) is sent to processing logic 140 via the MUX 125, in accordance with one embodiment. In general, tweak build information is not stored in a tweak buffer until a tweak buffer is available (i.e., until the buffer is not storing other tweak build information that hasn't been sent to processing logic 140 yet). Tweak buffer logic 120 may have one or more buffers. The number of buffers determines the number of outstanding tweak build requests that can be supported by tweak builder logic 110.

Again, path control logic 130 is configured to control an internal data path and data flow through the data cryptography device 100, as part of the cryptography process, in response to receiving path control information for each command of the input data. The path control information is received via the path interface (I/F) and includes a path start signal, a path identifier (ID) for each command, and a number of sectors to encrypt or decrypt for each command.

Referring again to FIG. 1, one example of path control logic 130 controlling an internal data path and data flow through the data cryptography device 100 in response to receiving path control information is as follows. Path control logic 130 is configured to connect a data path to a particular buffer that is pointed to by the path ID in tweak buffer logic 120. Path control logic 130 monitors the buffer and, as soon as the monitored buffer becomes valid (not empty), a start request is sent to processing logic 140. An internal counter is also activated within path control logic 130 to count the number of sectors that have been processed. Path control logic 130 does not switch to another buffer until the counter reaches the value specified by the number of sectors. When the start request of the last sector is accepted by processing logic 140 (the last sector may not be processed yet), path control logic 130 returns a done signal and is ready to take the next path start signal.

Figure 4:
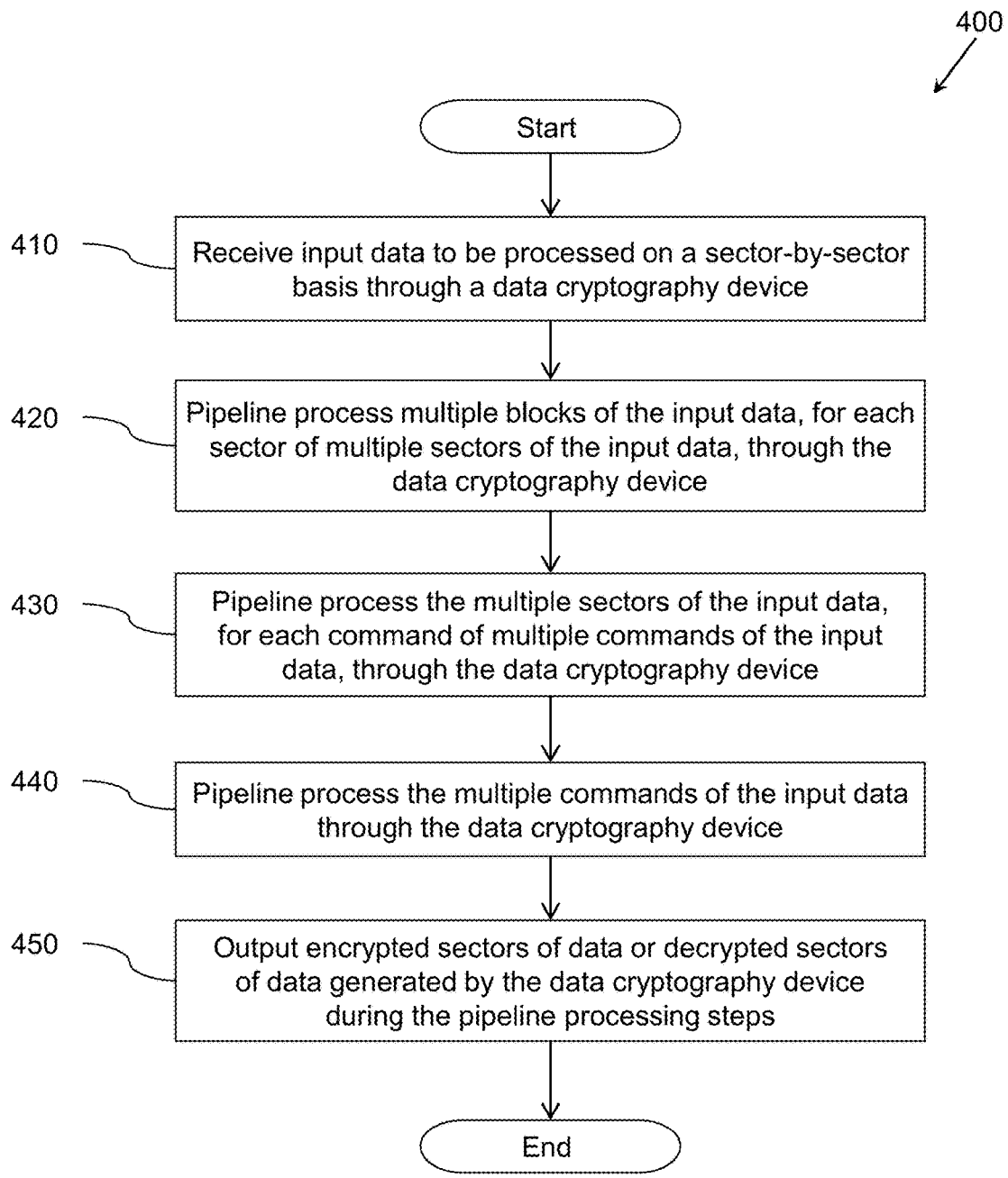
FIG. 4. illustrates one embodiment of a method, performable by the data cryptography device of FIG. 1, to mitigate preparation and processing time delays through the data cryptography device while encrypting or decrypting data.

FIG. 4. illustrates one embodiment of a method 400, performable by the data cryptography device 100 of FIG. 1, to mitigate preparation and processing time delays through the data cryptography device while encrypting or decrypting data. FIG. 4 captures, in flowchart form, the functions and processes previously discussed herein with respect to FIGS. 1-3. Method 400 can be performed by the logics or modules of the image processing device 100 of FIG. 1, or by another computing device (e.g., an integrated circuit) configured with an algorithm of method 400.

Method 400 will be described from the perspective that input data, organized as blocks, sectors, and commands, is to be encrypted or decrypted. The input data may originate, for example, on a storage disk (in encrypted form) or in a database system (in un-encrypted form). For example, encrypted input data may be accessed from a storage disk, decrypted, and sent to a database system for processing. Alternatively, un-encrypted input data may be accessed from a database system, encrypted, and sent to a storage disk for secure storage of the data.

Upon initiating method 400, at 410, input data is received by a data cryptography device 100 which is to be processed on a sector-by-sector basis through the data cryptography device 100. In accordance with one embodiment, the input data is received into processing logic 140 and is structured as multiple commands, with each command including multiple sectors of the input data, and with each sector including multiple blocks of the input data.

At blocks 420 through 440, the input data is processed through the data cryptography device 100 to generate encrypted sectors of data or decrypted sectors of data while mitigating time delays through the data cryptography device 100. The input data is pipeline processed through the data cryptography device 100 at the block level, the sector level, and the command level at blocks 420 through 440. It is to be understood herein that the input data is processed sector-by-sector, in accordance with one embodiment, and that the pipeline processing at any level (block, sector, command) is performed at the appropriate point (e.g., when going from block to block, when going from sector to sector, when going from command to command) as the input data is streamed into the data cryptography device.

Figure 5:
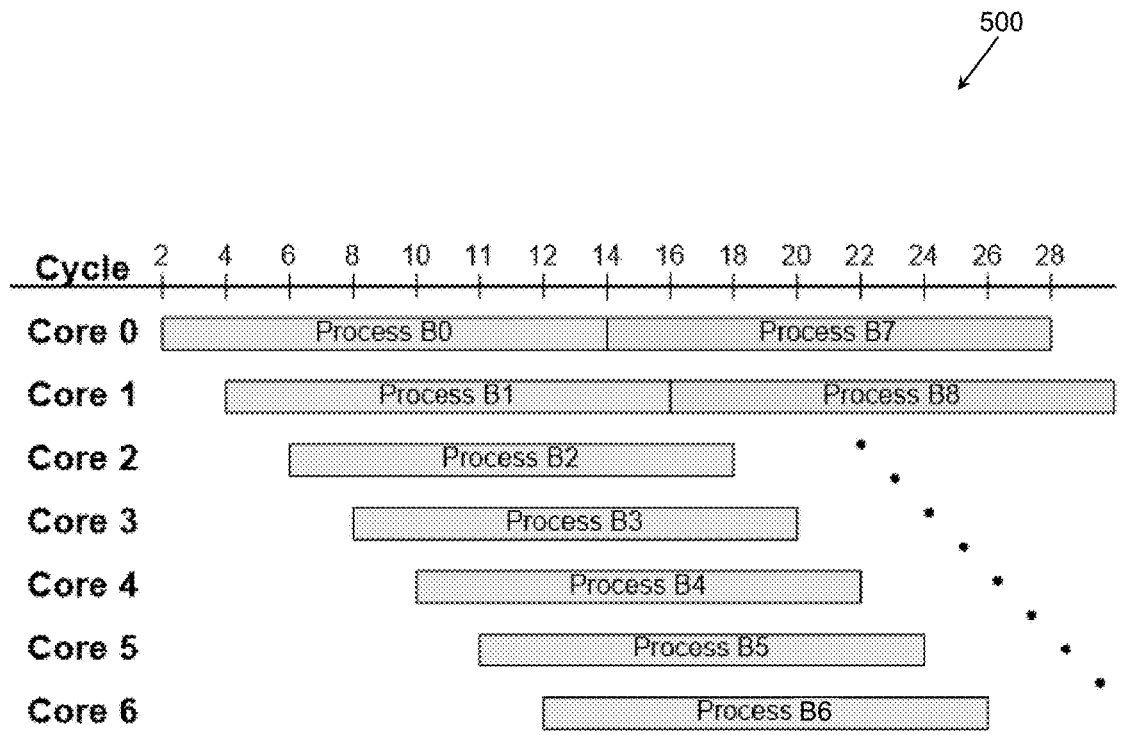
FIG. 5 illustrates a first example of a timing diagram associated with one embodiment of pipeline processing blocks of a sector of data using a multi-core processor of the processing logic of FIG. 2.

In particular, at block 420, the multiple blocks of the input data, for each sector, are pipeline processed through the data cryptography device 100. FIG. 5 illustrates a first example of a timing diagram 500 associated with one embodiment of pipeline processing blocks of a sector of input data using the multi-core processor 144 of processing logic 140 of FIG. 2 to mitigate latencies between blocks. Processing latencies between blocks can be reduced by pipeline processing the blocks of a sector of the input data through the cores. In FIG. 5, it is assumed that the multi-core processor 144 of FIG. 2 has seven (7) cores (core 0 through core 6). The seven (7)-core design can saturate a 64-bit data bus such that processing of a next 16-byte AES block can begin every two (2) clock cycles as shown in FIG. 5. Each block takes seven (7) clock cycles to process, as shown in FIG. 5.

As an example, assume a sector is 512 bytes having 32 AES blocks (i.e., 16 bytes per AES block) and the data bus (input interface I/F) is 64-bits. The encryption/decryption processing in a single core design takes 448 clock cycles. The encryption/decryption processing in a 7-core design takes only 46 clock cycles. However, if every sector suffers from a worst case preparation latency of 48 clock cycles, the performance drop is about 10% in the single-core design and about 50% in the 7-core design. Therefore, it is desirable to also mitigate latencies between sectors.

Figure 6:
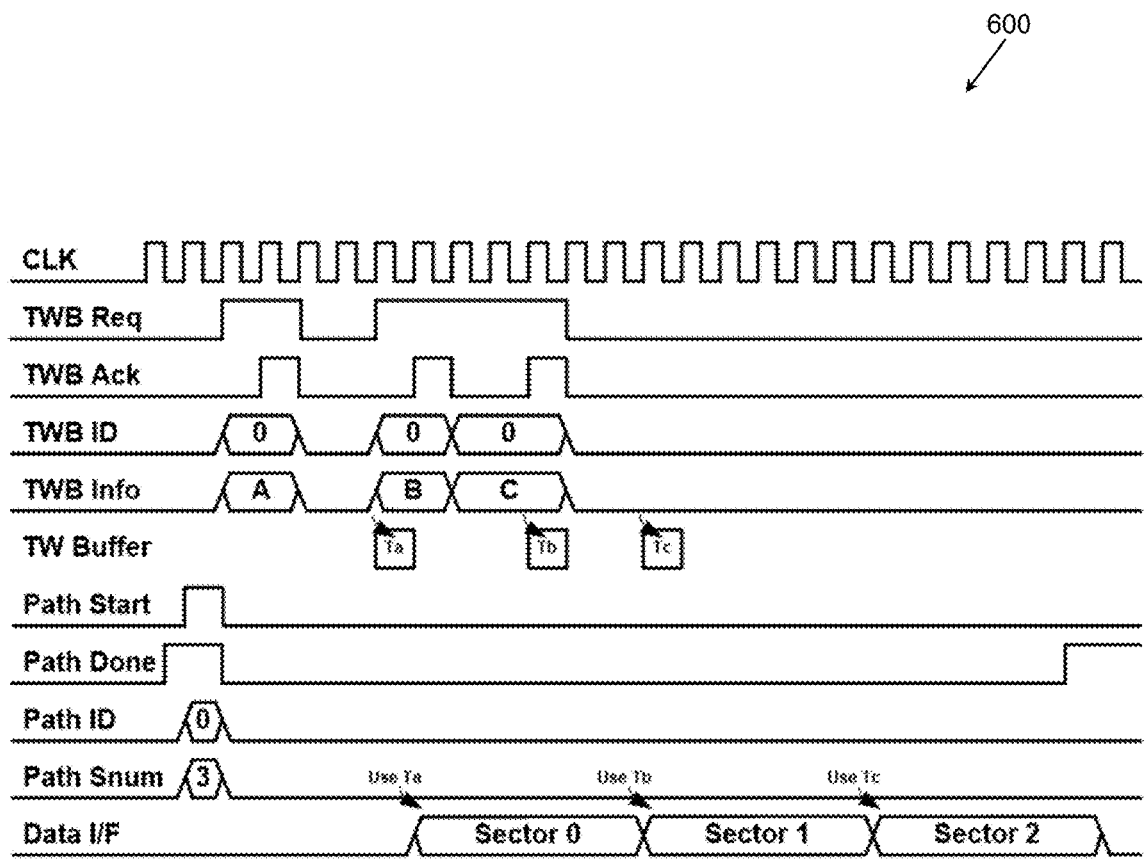
FIG. 6 illustrates a second example of a timing diagram associated with one embodiment of pipeline processing multiple sectors of data through the data cryptography device of FIG. 1.

At block 430, multiple sectors of the input data are pipeline processed for each command through the data cryptography device 100 to mitigate latencies between sectors. FIG. 6 illustrates a second example of a timing diagram 600 associated with one embodiment of pipeline processing multiple sectors of data through the data cryptography device 100 of FIG. 1. FIG. 6 assumes that there is one (1) command having three (3) sectors (Sector 0, Sector 1, Sector 2) and that tweak buffer logic 120 contains only one (1) tweak buffer.

Referring to FIG. 6, the path start signal is triggered before any tweak build request is received. The data transfer uses tweak buffer zero (0) (Path ID 0). Since the tweak build request occurs later than the path start signal, processing logic 140 is not able to process data until the tweak is built and ready (i.e., until tweak build logic 110 has performed its functions for sector 0). A path done signal is deasserted immediately after the path start signal is detected to indicate that processing logic 140 is linked to the target tweak buffer.

As the tweak build requests (TWB Req) come in for each sector, the corresponding tweak build information (Ta, Tb, Tc) is generated by tweak builder logic 110 and stored in tweak buffer zero (0) of tweak buffer logic 120. The tweak build information for a sector is transferred to processing logic 140 before the tweak build information for the next sector can be stored in tweak buffer zero (0). However, tweak builder logic 110 can be processing a next tweak build request, even before the tweak build information from the previous request is cleared from the buffer. In this manner, the sectors end up being pipeline processed through the data cryptography device 100, mitigating preparation latencies between sectors. Again, as each sector is processed, the blocks of each sector are pipelined through the cores of the multi-core processor 144 as described previously herein (see FIG. 5).

As soon as the cores of the multi-core processor 144 receive all of the sectors of the command, the path done signal is asserted to indicate that the tweak buffer is unlinked and that the data cryptography device 100 can accept another path start signal. However, the path done signal does not indicate the completion of data transfer/processing.

Figure 7:
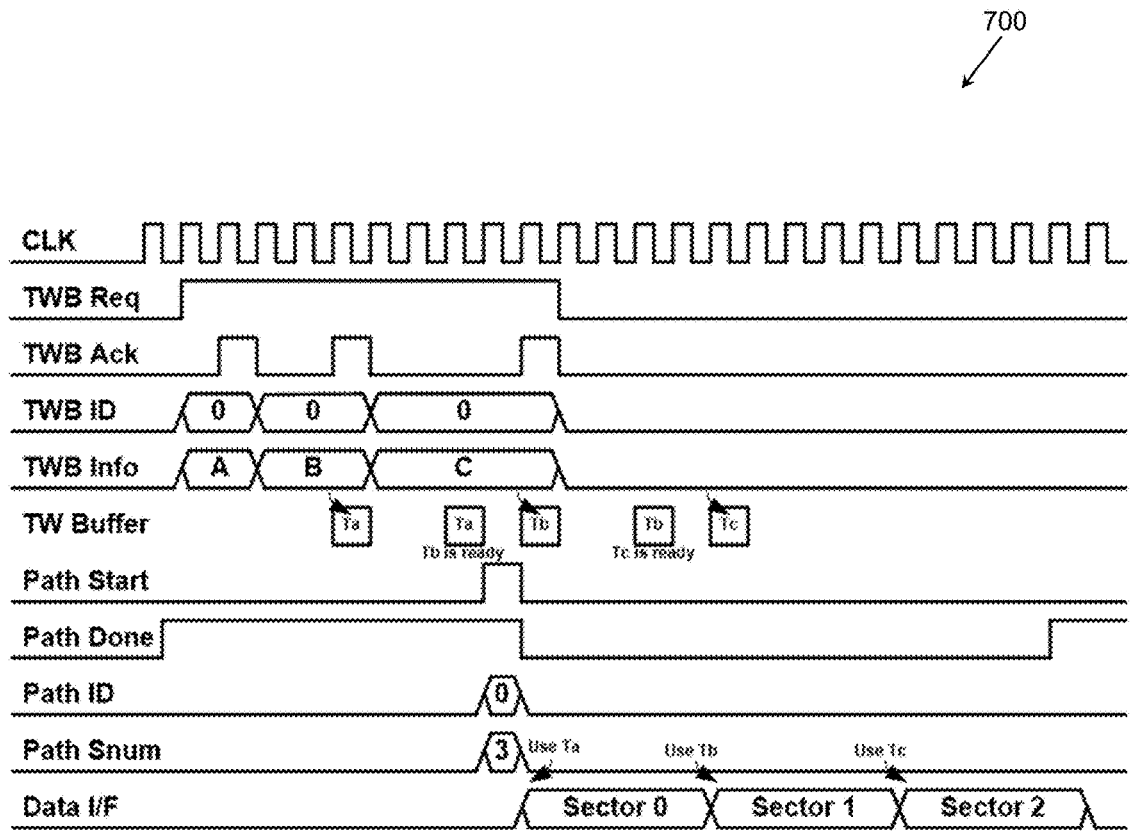
FIG. 7 illustrates a third example of a timing diagram associated with one embodiment of pipeline processing multiple sectors of data through the data cryptography device of FIG. 1.

As another example of the pipeline processing of sectors, FIG. 7 illustrates a third example of a timing diagram 700 associated with one embodiment of pipeline processing multiple sectors of input data through the data cryptography device 100 of FIG. 1. Again, it is assumed that there is one (1) command having three (3) sectors (Sector 0, Sector 1, Sector 2) and that tweak buffer logic 120 contains only one (1) tweak buffer.

In FIG. 7, the path start signal is triggered after several tweak build requests (TWB Req) are received. Although the tweak build information Ta for the first sector (Sector 0) is built and ready, processing logic 140 is not able to start processing the data of Sector 0 because the tweak buffer has not yet been selected. Once, the path start signal comes along and the path done signal is deasserted immediately after the path start signal, processing logic 140 is linked to the single tweak buffer. The single tweak buffer can be cleared by transferring the tweak buffer information Ta to processing logic 140. Processing logic 140 can immediately start processing Sector 0 since the tweak buffer information Ta is immediately available.

In the example of FIG. 7, the tweak buffer information Tb for Sector 1 is actually generated and ready before the processing of Sector 0 begins. However, Tb does not take the place of Ta in the tweak buffer until Ta is transferred from the tweak buffer to processing logic 140 and the processing of Sector 0 begins. Similarly, tweak buffer information Tc for Sector 2 is actually generated and ready before the processing of Sector 1 begins. However, Tc does not take the place of Tb in the tweak buffer until Tb is transferred from the tweak buffer to processing logic 140 and the processing of Sector 1 begins. In this manner, the sectors end up being pipeline processed through the data cryptography device 100, mitigating preparation latencies between sectors to the extent that a single buffer allows.

Figure 8:
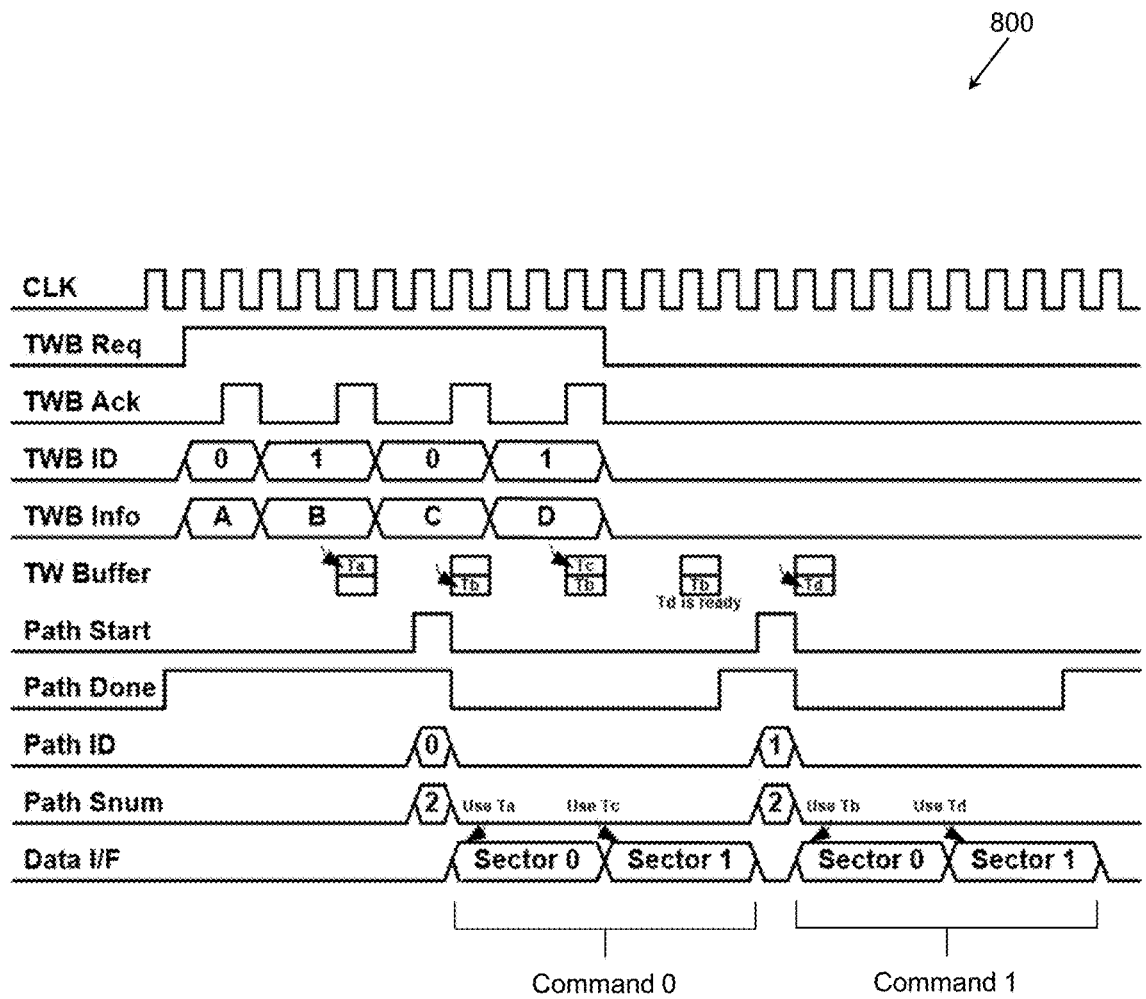
FIG. 8 illustrates a fourth example of a timing diagram associated with one embodiment of pipeline processing multiple sectors and multiple commands of data through the data cryptography device of FIG. 1.

At block 440, multiple commands of the input data are pipeline processed through the data cryptography device 100 to mitigate latencies between commands. FIG. 8 illustrates a fourth example of a timing diagram 800 associated with one embodiment of pipeline processing multiple sectors and multiple commands of data through the data cryptography device 100 of FIG. 1. FIG. 8 assumes that there are two (2) commands (Command 0, Command 1) each having two (2) sectors (Sector 0, Sector 1) and that tweak buffer logic 120 contains two (2) tweak buffers. In the example of FIG. 8, two (2) path IDs are used to accommodate the processing of the two commands.

For the two buffers to be efficiently utilized in the example of FIG. 8, the tweak build requests (TWB Req) are organized to be received by the data cryptography device 100 as follows: TWB request for Sector 0 of Command 0, followed by TWB request for Sector 0 of Command 1, followed by TWB request for Sector 1 of Command 0, followed by TWB request for Sector 1 of Command 1.

In this manner, as seen in FIG. 8, Ta is generated first and stored in the first tweak buffer (associated with TWB ID 0), Tb is generated second and is stored in the second tweak buffer (associated with TWB ID 1). Tc is generated third and is stored in the first tweak buffer after Ta has been transferred to processing logic 140 for the processing of Sector 0 of Command 0. Once generated, Tc can be immediately transferred to processing logic 140 for processing of Sector 1 of Command 0. Tb is held over in the second tweak buffer, until Sector 0 of Command 1 is ready to be processed. Also, Td is generated while Tb is being held over. Finally, Tb is transferred for the processing of Sector 0 of Command 1, and Td is stored in the second tweak buffer and then transferred to processing logic 140 for the processing of Sector 1 of Command 1. In this manner, utilizing two buffers, the latencies between the commands and the sectors within the commands are mitigated.

At block 450, the encrypted sectors of data or the decrypted sectors of data generated by the data cryptography device 100 during the multi-level pipeline processing steps, are output by the data cryptography device 100 (e.g., to a disk storage device or to a database system). In this manner, pipeline processing of the input data at the block, sector, and command levels can greatly reduce the latencies (time delays) through the data cryptography device 100 compared to not using multiple levels of pipeline processing. The architecture of the data cryptography device (see FIGS. 1-3) supports the pipeline processing at the multiple levels.

Integrated Circuit Device Embodiment

Figure 9:
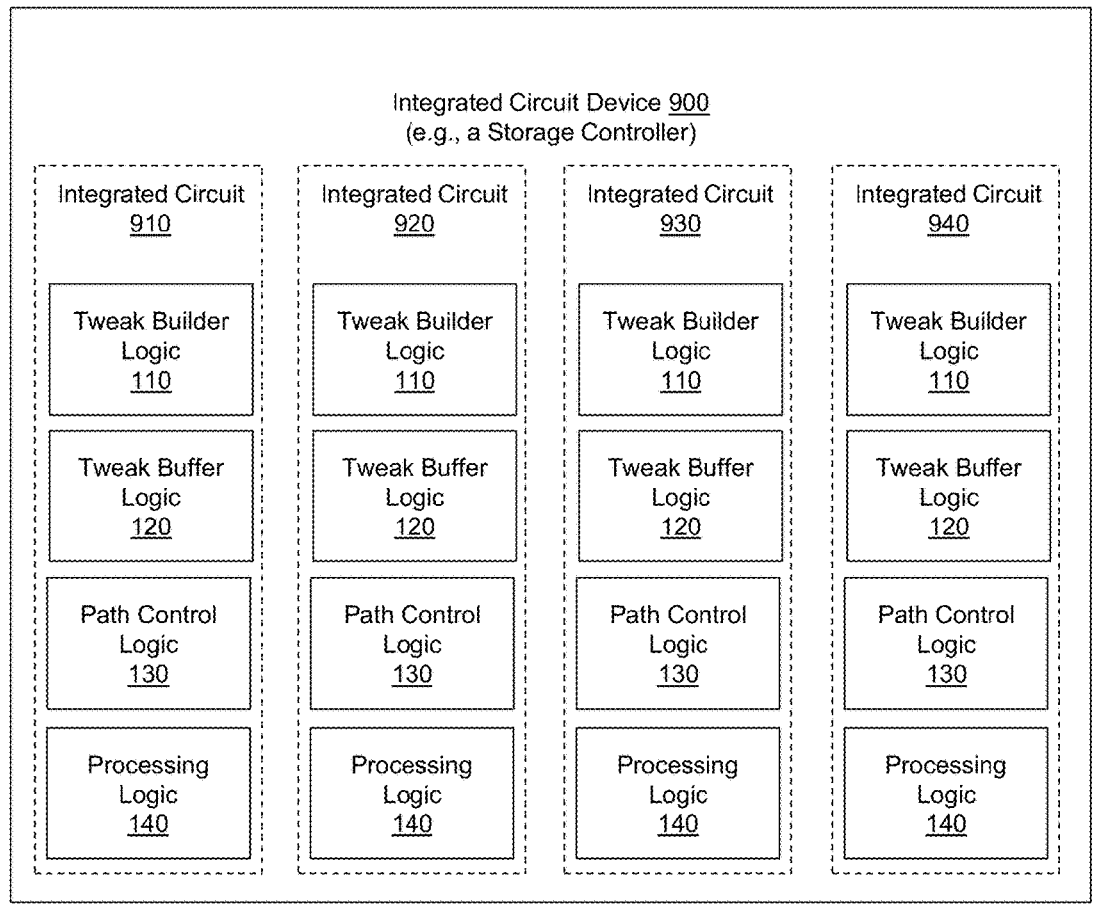
FIG. 9 illustrates one embodiment of the data cryptography device of FIG. 1 implemented in an integrated circuit device.

FIG. 9 illustrates one embodiment of the data cryptography device 100 of FIG. 1 implemented multiple times as integrated circuits 910-940 in an integrated circuit device 900. The integrated circuit device 900 may be a storage controller configured to control the storage and accessing of data to/from a disk storage device, for example. In this embodiment, the tweak builder logic 110, the tweak buffer logic 120, the path control logic 130, and the processing logic 140 are each embodied on a same integrated circuit (910, 920, 930, and 940).

The logics are connected via connection paths to communicate signals. While integrated circuits 910, 920, 930, and 940 are illustrated as separate integrated circuits, they may be integrated into a common integrated circuit device 900. In general, integrated circuits 910, 920, 930, and 940 may be combined into fewer integrated circuits or divided into more integrated circuits than illustrated. For example, in one embodiment, the integrated circuit device 900 may be a single integrated circuit chip configured as a storage controller. In other embodiments, portions of the functionality associated with the tweak builder logic 110, the tweak buffer logic 120, the path control logic 130, and the processing logic 140 may be embodied as firmware executable by a processor and stored in a non-transitory memory (e.g., a non-transitory computer storage medium).

In one embodiment, the integrated circuits are fabricated on a single integrated circuit chip in encryption/decryption pairs. For example, integrated circuit 910 may be used for encryption while integrated circuit 920 may be used for decryption in operation with a first disk storage device. Similarly, integrated circuit 930 may be used for encryption while integrated circuit 940 may be used for decryption in operation with a second disk storage device.

Systems, methods, and other embodiments associated mitigating time delays between blocks, sectors, and commands of input data to be encrypted or decrypted have been described. Pipeline processing of the input data is accomplished on multiple levels (blocks, sectors, commands) to mitigate the time delays. A multi-core processor, multiple tweak buffers, and path control logic are integral components for accomplishing the multi-level pipeline processing, in accordance with one embodiment.

Definitions and Other Embodiments

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable (or operative) connection", or a connection by which entities are "operably (or operatively) connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection. The terms "operable" and "operative", and there various forms, may be used interchangeably herein.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims.

What is claimed is:

1. A data cryptography device, for mitigating time delays through the data cryptography device, comprising:
    processing logic, including a multi-core processor, configured for receiving input data to be encrypted or decrypted as part of a cryptography process on a sector-by-sector basis, wherein the input data is organized into multiple commands, with each command of the multiple commands including multiple sectors of the input data, and with each sector of the multiple sectors including multiple blocks of the input data;
    path control logic configured for controlling an internal data path and data flow through the data cryptography device, as part of the cryptography process, in response to receiving path control information for each command of the multiple commands; and
    the processing logic further configured for:
        pipeline processing the multiple blocks, for each sector of the multiple sectors, via the multi-core processor, based at least in part on a tweak zero value and a last round key value computed for each sector of the multiple sectors,
        pipeline processing the multiple sectors, for each command of the multiple commands, based at least in part on the path control information, and
        pipeline processing the multiple commands based at least in part on the path control information.

2. The data cryptography device of claim 1, wherein the path control information includes a start signal, a path identifier, and a number of sectors to be processed for each command of the multiple commands.

3. The data cryptography device of claim 1, wherein the processing logic includes input exclusive-or logic and output exclusive-or logic that are configured to operate independently of each other as part of the cryptography process.

4. The data cryptography device of claim 1, wherein the processing logic includes core control logic configured to determine which idle core of the multi-core processor to use next as part of the cryptography process and which core of the multi-core processor to output encrypted or decrypted data from next as part of the cryptography process.

5. The data cryptography device of claim 1, further comprising:
    tweak builder logic configured for performing range searching, tweak zero computations, and last round key computations, as part of the cryptography process, in response to receiving a tweak build request for a given sector of the multiple sectors of the input data; and
    tweak buffer logic configured for buffering at least the tweak zero value and the last round key value computed by the tweak builder logic for the given sector of the multiple sectors of the input data as part of the cryptography process.

6. The data cryptography device of claim 5, wherein the tweak builder logic includes range search logic configured to retrieve range information from an external memory as part of the cryptography process, wherein the range information includes at least an initialization vector and multiple keys, for the given sector of the multiple sectors of the input data, used for encrypting or decrypting the given sector of the multiple sectors.

7. The data cryptography device of claim 6, wherein the tweak builder logic includes an encryption core processor configured to compute the tweak zero value and the last round key value simultaneously for the given sector of the multiple sectors, as part of the cryptography process, based on the range information.

8. The data cryptography device of claim 7, wherein the tweak builder logic includes tweak control logic configured to control the range search logic, the encryption core processor, and the tweak buffer logic based on the tweak build request, wherein the tweak build request includes a sector logical block address, a sector size, and a tweak buffer identifier.

9. The data cryptography device of claim 5, wherein the tweak buffer logic includes multiple tweak buffers, and wherein each tweak buffer of the multiple tweak buffers is configured to temporarily store tweak buffer information associated with a tweak build request for the given sector of the multiple sectors.

10. The data cryptography device of claim 9, wherein the tweak buffer information associated with a tweak build request includes at least one of a tweak zero value, a last round key value, a sector size, a bypass indicator, a first key, a key size, and a valid bit indicating if a tweak buffer of the multiple tweak buffers is valid or empty.

11. A method performed by a data cryptography device, the method comprising:
  receiving input data to be processed on a sector-by-sector basis through the data cryptography device,
    wherein the input data is organized as multiple commands of the input data, with each command of the multiple commands including multiple sectors of the input data, and with each sector of the multiple sectors including multiple blocks of the input data;
  processing the input data through the data cryptography device to generate encrypted sectors of data or decrypted sectors of data while mitigating time delays through the data cryptography device by:
    pipeline processing the multiple blocks of the input data, for each sector of the multiple sectors, through the data cryptography device,
    pipeline processing the multiple sectors of the input data, for each command of the multiple commands, through the data cryptography device, and
    pipeline processing the multiple commands of the input data through the data cryptography device; and
  outputting the encrypted sectors of data or the decrypted sectors of data generated by the data cryptography device during the processing of the input data.

12. The method of claim 11, wherein the pipeline processing of the multiple blocks for each sector of the multiple sectors is accomplished via a multi-core processor of the data cryptography device.

13. The method of claim 11, wherein the time delays include preparation time delays associated with each sector of the multiple sectors, and wherein the preparation time delays include at least one of range search latencies, tweak zero computation latencies, or last round key computation latencies.

14. The method of claim 11, wherein the time delays include processing time delays associated with each block of the multiple blocks, and wherein the processing time delays include at least one of data fetching latencies or data processing latencies.

15. The method of claim 11, wherein the processing of the input data is based on an advanced encryption standard (AES) and an exclusive-or/encrypt/exclusive-or encryption mode with tweak and ciphertext stealing (XTS).

16. The method of claim 11, further comprising receiving a tweak build request for each sector of the multiple sectors, wherein the tweak build request includes a sector logical block address, a sector size, and a buffer identifier.

17. The method of claim 11, further comprising receiving path control information for each command of the multiple commands, wherein the path control information includes a start signal, a path identifier, and a number of sectors.

18. An integrated circuit chip, the integrated circuit chip comprising:
  processing logic, including a multi-core processor, configured as a first integrated circuit on the integrated circuit chip for receiving input data to be encrypted or decrypted as part of a cryptography process on a sector-by-sector basis, wherein the input data is organized into multiple commands, with each command of the multiple commands including multiple sectors of the input data, and with each sector of the multiple sectors including multiple blocks of the input data;
  tweak builder logic configured as a second integrated circuit on the integrated circuit chip for performing range searching, tweak zero computations, and last round key computations, as part of the cryptography process, in response to receiving a tweak build request for a sector of the multiple sectors of the input data;
  tweak buffer logic configured as a third integrated circuit on the integrated circuit chip for buffering at least a tweak zero value and a last round key value computed by the tweak builder logic for each sector of the multiple sectors of the input data as part of the cryptography process;
  path control logic configured as a fourth integrated circuit on the integrated circuit chip for controlling an internal data path and data flow through a data cryptography device, as part of the cryptography process, in response to receiving path control information for each command of the multiple commands; and
  the processing logic further configured for:
    pipeline processing the multiple blocks for each sector of the multiple sectors, via the multi-core processor, based at least in part on the tweak zero value and the last round key value for each sector of the multiple sectors,
    pipeline processing the multiple sectors for each command of the multiple commands based at least in part on the path control information, and
    pipeline processing the multiple commands based at least in part on the path control information.

19. The integrated circuit chip of claim 18, wherein the processing logic includes input exclusive-or logic and output exclusive-or logic that are configured to operate independently of each other as part of the cryptography process.

20. The integrated circuit chip of claim 18, wherein the tweak builder logic includes an encryption core processor configured to compute the tweak zero value and the last round key value simultaneously for a sector of the multiple sectors of the input data as part of the cryptography process.

* * * * *